United States Patent
Wagner et al.

(10) Patent No.: US 10,596,696 B2
(45) Date of Patent: Mar. 24, 2020

(54) SYSTEMS AND METHODS FOR PROCESSING OBJECTS INCLUDING A LINEAR GANTRY SYSTEM

(71) Applicant: Berkshire Grey, Inc., Lexington, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Pittsburgh, PA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 15/923,765

(22) Filed: Mar. 16, 2018

(65) Prior Publication Data
US 2018/0265311 A1    Sep. 20, 2018

Related U.S. Application Data

(60) Provisional application No. 62/473,082, filed on Mar. 17, 2017.

(51) Int. Cl.
*B25J 9/00* (2006.01)
*B65G 47/82* (2006.01)
(Continued)

(52) U.S. Cl.
CPC ............. *B25J 9/0093* (2013.01); *B25J 9/026* (2013.01); *B25J 9/1612* (2013.01); *B25J 9/1615* (2013.01);
(Continued)

(58) Field of Classification Search
CPC ............................. B65G 1/045; B25J 9/0093
See application file for complete search history.

(56) References Cited

U.S. PATENT DOCUMENTS

| 4,412,775 A | 11/1983 | Molitor et al. |
| 4,557,659 A | 12/1985 | Scaglia |

(Continued)

FOREIGN PATENT DOCUMENTS

| AU | 2006204622 A1 | 3/2007 |
| CA | 2985166 A1 | 12/2016 |

(Continued)

OTHER PUBLICATIONS

International Search Report & Written Opinion issued by International Searching Authority in related International Patent Application PCT/US2018/022927 dated Jun. 25, 2018, 12 pgs.

(Continued)

*Primary Examiner* — Thomas Randazzo
(74) *Attorney, Agent, or Firm* — Gesmer Updegrove LLP

(57) ABSTRACT

A storage, retrieval and processing system for processing objects is disclosed. The storage, retrieval and processing system includes a plurality of storage bins providing storage of a plurality of objects, where the plurality of storage bins (Continued)

being in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and is adapted for movement of the programmable motion device along a first direction, and a plurality of destination bins that are provided in at least one linear arrangement along the first direction of movement of the programmable motion device.

23 Claims, 14 Drawing Sheets

(51) Int. Cl.
  *B25J 9/02* (2006.01)
  *B65G 1/137* (2006.01)
  *B65G 47/90* (2006.01)
  *B25J 9/16* (2006.01)

(52) U.S. Cl.
  CPC .......... *B65G 1/137* (2013.01); *B65G 1/1378* (2013.01); *B65G 47/82* (2013.01); *B65G 47/905* (2013.01); *B65G 2201/0258* (2013.01)

(56) References Cited

U.S. PATENT DOCUMENTS

| | | | |
|---|---|---|---|
| 4,678,390 A | 7/1987 | Bonneton et al. | |
| 4,722,653 A | 2/1988 | Williams et al. | |
| 4,846,619 A * | 7/1989 | Crabtree | B65G 1/0435 414/273 |
| 5,082,103 A | 1/1992 | Ross et al. | |
| 5,281,081 A * | 1/1994 | Kato | B65G 1/1378 414/789.6 |
| 5,595,263 A | 1/1997 | Pignataro | |
| 6,011,998 A * | 1/2000 | Lichti | B65G 1/1376 414/268 |
| 6,036,812 A * | 3/2000 | Williams | B65G 1/045 156/277 |
| 6,059,092 A | 5/2000 | Jerue et al. | |
| 6,079,570 A | 6/2000 | Oppliger et al. | |
| 6,377,867 B1 | 4/2002 | Bradley et al. | |
| 6,390,756 B1 | 5/2002 | Isaacs et al. | |
| 6,505,093 B1 | 1/2003 | Thatcher et al. | |
| 6,579,053 B1 | 6/2003 | Grams et al. | |
| 8,776,694 B2 | 7/2014 | Rosenwinkel et al. | |
| 8,997,438 B1 * | 4/2015 | Fallas | B65G 47/914 414/222.01 |
| 9,020,632 B2 * | 4/2015 | Naylor | B65G 1/065 414/273 |
| 9,102,336 B2 | 8/2015 | Rosenwinkel | |
| 9,481,518 B2 | 11/2016 | Neiser | |
| 9,688,471 B2 | 6/2017 | Hellenbrand | |
| 9,751,693 B1 * | 9/2017 | Battles | G06Q 10/087 |
| 9,821,464 B2 | 11/2017 | Stiernagle et al. | |
| 9,878,349 B2 | 1/2018 | Crest et al. | |
| 10,029,865 B1 * | 7/2018 | McCalib, Jr. | B65G 1/06 |
| 2002/0092801 A1 | 7/2002 | Dominguez | |
| 2002/0157919 A1 * | 10/2002 | Sherwin | B65B 5/105 198/370.01 |
| 2003/0014376 A1 | 1/2003 | DeWitt et al. | |
| 2003/0075051 A1 * | 4/2003 | Watanabe | B65B 5/105 99/325 |
| 2005/0268579 A1 * | 12/2005 | Natterer | B65B 7/164 53/553 |
| 2008/0046116 A1 | 2/2008 | Khan et al. | |
| 2008/0113440 A1 | 5/2008 | Gurney et al. | |
| 2008/0181753 A1 * | 7/2008 | Bastian | B65G 1/026 414/277 |
| 2009/0047178 A1 | 2/2009 | Chojnacki et al. | |
| 2010/0276248 A1 * | 11/2010 | Gut | B07C 5/3408 198/370.02 |
| 2011/0238207 A1 * | 9/2011 | Bastian, II | B65G 61/00 700/217 |
| 2011/0243707 A1 * | 10/2011 | Dumas | B65B 5/105 414/806 |
| 2012/0118699 A1 | 5/2012 | Buchmann et al. | |
| 2012/0177465 A1 * | 7/2012 | Koholka | B65G 1/0485 414/279 |
| 2013/0110280 A1 | 5/2013 | Folk | |
| 2013/0334158 A1 * | 12/2013 | Koch | B65G 67/603 212/291 |
| 2014/0086709 A1 | 3/2014 | Kasai | |
| 2014/0086714 A1 | 3/2014 | Malik | |
| 2014/0244026 A1 * | 8/2014 | Neiser | B65G 1/1373 700/216 |
| 2014/0277693 A1 | 9/2014 | Naylor | |
| 2015/0098775 A1 | 4/2015 | Razumov | |
| 2015/0114799 A1 * | 4/2015 | Hansl | B65G 1/1378 198/601 |
| 2015/0203297 A1 * | 7/2015 | Manning | F25D 13/06 700/218 |
| 2015/0346708 A1 * | 12/2015 | Mattern | G05B 19/19 700/114 |
| 2016/0075521 A1 | 3/2016 | Puchwein et al. | |
| 2016/0136816 A1 | 5/2016 | Pistorino | |
| 2016/0167227 A1 * | 6/2016 | Wellman | B25J 9/1612 700/259 |
| 2016/0176638 A1 | 6/2016 | Toebes | |
| 2016/0244262 A1 | 8/2016 | O'Brien et al. | |
| 2016/0325934 A1 * | 11/2016 | Stiernagle | G07F 11/165 |
| 2016/0347545 A1 * | 12/2016 | Lindbo | B65G 61/00 |
| 2017/0043953 A1 | 2/2017 | Battles et al. | |
| 2017/0080566 A1 | 3/2017 | Stubbs et al. | |
| 2017/0121114 A1 * | 5/2017 | Einav | B65D 21/0235 |
| 2017/0322561 A1 | 11/2017 | Stiernagle | |
| 2017/0349385 A1 | 12/2017 | Moroni et al. | |
| 2018/0085788 A1 | 3/2018 | Engel et al. | |
| 2018/0244473 A1 * | 8/2018 | Mathi | B65G 1/1378 |

FOREIGN PATENT DOCUMENTS

| | | |
|---|---|---|
| CN | 102390701 A | 3/2013 |
| DE | 102004001181 A1 | 8/2005 |
| DE | 102007028680 A1 | 12/2008 |
| DE | 102007038834 A1 | 2/2009 |
| DE | 102010002317 A1 | 8/2011 |
| DE | 102012102333 A1 | 9/2013 |
| EP | 0235488 B1 | 1/1990 |
| EP | 0767113 A2 | 4/1997 |
| EP | 2233400 A1 | 9/2010 |
| EP | 2650237 A1 * | 10/2013 |
| EP | 2650237 A1 | 10/2013 |
| EP | 2937299 A1 | 10/2015 |
| EP | 3112295 A1 | 1/2017 |
| JP | 54131278 A * | 10/1979 |
| JP | H08157016 A | 6/1996 |
| WO | 03095339 A1 | 11/2003 |
| WO | 2008091733 A2 | 7/2008 |
| WO | 2011038442 A2 | 4/2011 |
| WO | 2012127102 A1 | 9/2012 |
| WO | 2014166650 A1 | 10/2014 |
| WO | 2015118171 A1 | 8/2015 |
| WO | 2016100235 A1 | 6/2016 |
| WO | 2017081281 A1 | 5/2017 |

OTHER PUBLICATIONS

Anver Corporation: "Vacuum Tube Lifting Systems," Nov. 22, 2004 (http://www.jrgindustries.com/assets/anver.pdf).

Communication pursuant to Rules 161(1) and 162 EPC issued by the European Patent Office dated Oct. 25, 2019 in related European Patent Application No. 18717156.6, 3 pages.

* cited by examiner

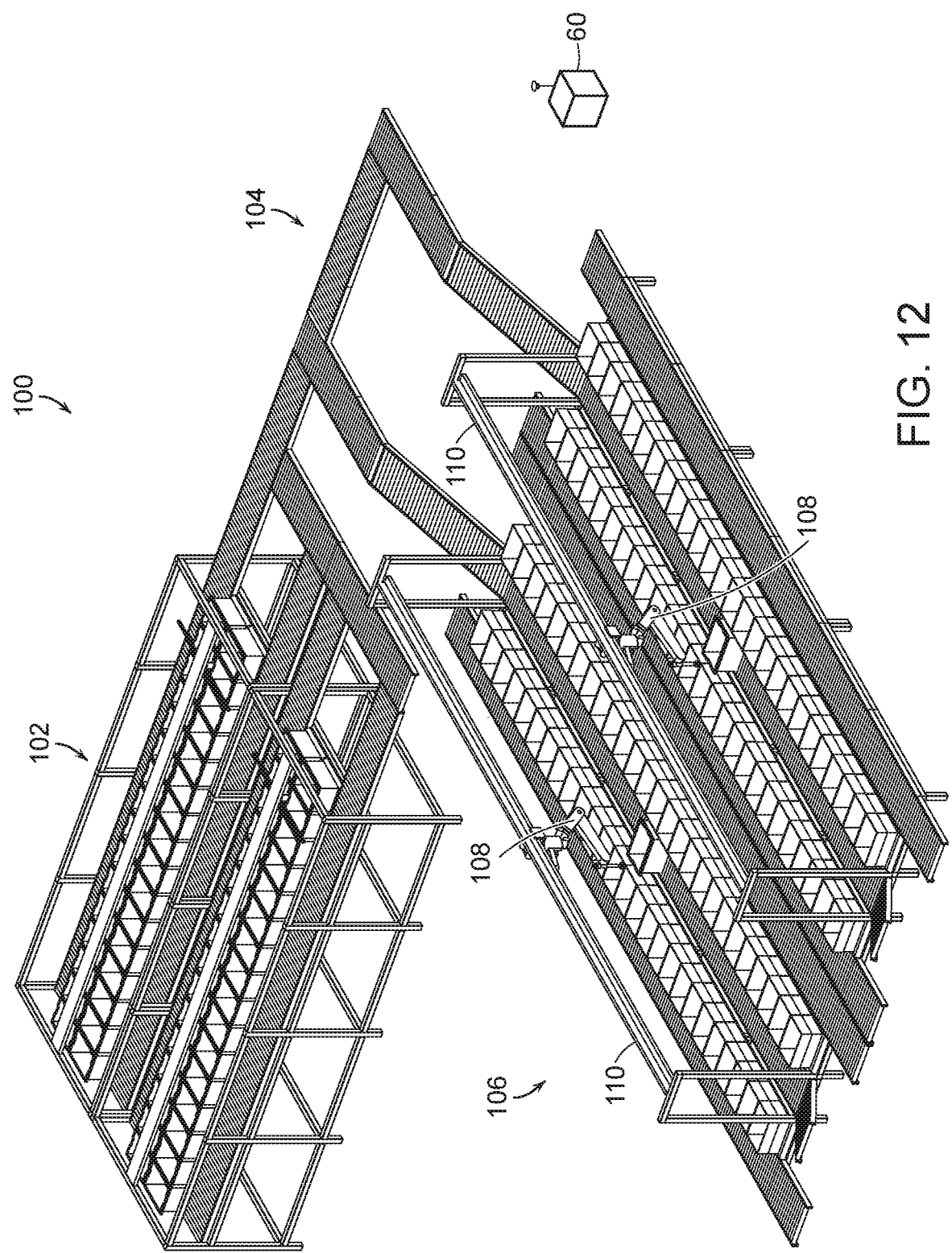

SYSTEMS AND METHODS FOR PROCESSING OBJECTS INCLUDING A LINEAR GANTRY SYSTEM

PRIORITY

The present application claims priority to U.S. Provisional Patent Application Ser. No. 62/473,082 filed Mar. 17, 2017, the disclosure of which is hereby incorporated by reference in its entirety.

BACKGROUND

The invention generally relates to storage and retrieval systems, and relates in particular to automated storage and retrieval systems that are used with systems for processing objects.

Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an embodiment, the invention provides a storage, retrieval and processing system for processing objects. The storage, retrieval and processing system includes a plurality of storage bins providing storage of a plurality of objects, where the plurality of storage bins being in communication with a retrieval conveyance system, a programmable motion device in communication with the retrieval conveyance system for receiving the storage bins from the plurality of bins, where the programmable motion device includes an end effector for grasping and moving a selected object out of a selected storage bin, and is adapted for movement of the programmable motion device along a first direction, and a plurality of destination bins that are provided in at least one linear arrangement along the first direction of movement of the programmable motion device.

In accordance with another embodiment, the invention the storage, retrieval and processing system includes a plurality of storage bins providing storage of a plurality of objects, where the plurality of storage bins being in communication with a retrieval conveyance system that includes automated means for providing selected storage bins to an input conveyance system, a programmable motion device in communication with the input conveyance system for receiving the selected storage bins from the plurality of bins, where the programmable motion device includes an end effector for grasping and moving a selected object out of each selected storage bin, and is adapted for movement of the programmable motion device along a first direction, and a plurality of destination bins being provided in at least one linear arrangement along the first direction of movement of the programmable motion device.

In accordance with a further embodiment, the invention provides a method of providing storage, retrieval and processing of objects. The method includes the steps of providing a plurality of storage bins for storing a plurality of objects, where the plurality of storage bins being in communication with a retrieval conveyance system, receiving a plurality of selected storage bins from the plurality of storage bins at a processing area in communication with a programmable motion device, grasping and moving selected objects out of a plurality of selected storage bins, and providing the selected objects to a plurality of destination bins.

BRIEF DESCRIPTION OF THE DRAWINGS

The following description may be further understood with reference to the accompanying drawings in which:

FIG. 12 shows an illustrative diagrammatic view of a storage, retrieval and processing system in accordance with a further embodiment of the present invention involving a plurality of rows of processing stations.

The drawings are shown for illustrative purposes only.

DETAILED DESCRIPTION

In accordance with an embodiment, the invention provides a storage, retrieval and processing system for processing objects. The system includes a plurality of storage bins providing storage of a plurality of objects, a programmable motion devices, and a plurality of destination bins. The plurality of storage bins are in communication with a retrieval conveyance system. The programmable motion device is in communication with the retrieval conveyance system for receiving the storage bins from the plurality of bins. The programmable motion device includes an end effector for grasping and moving a selected object out of a selected storage bin, and is adapted for movement along a first direction. The plurality of destination bins are provided in at least one linear arrangement along the first direction of movement of the programmable motion device.

Figure 1:
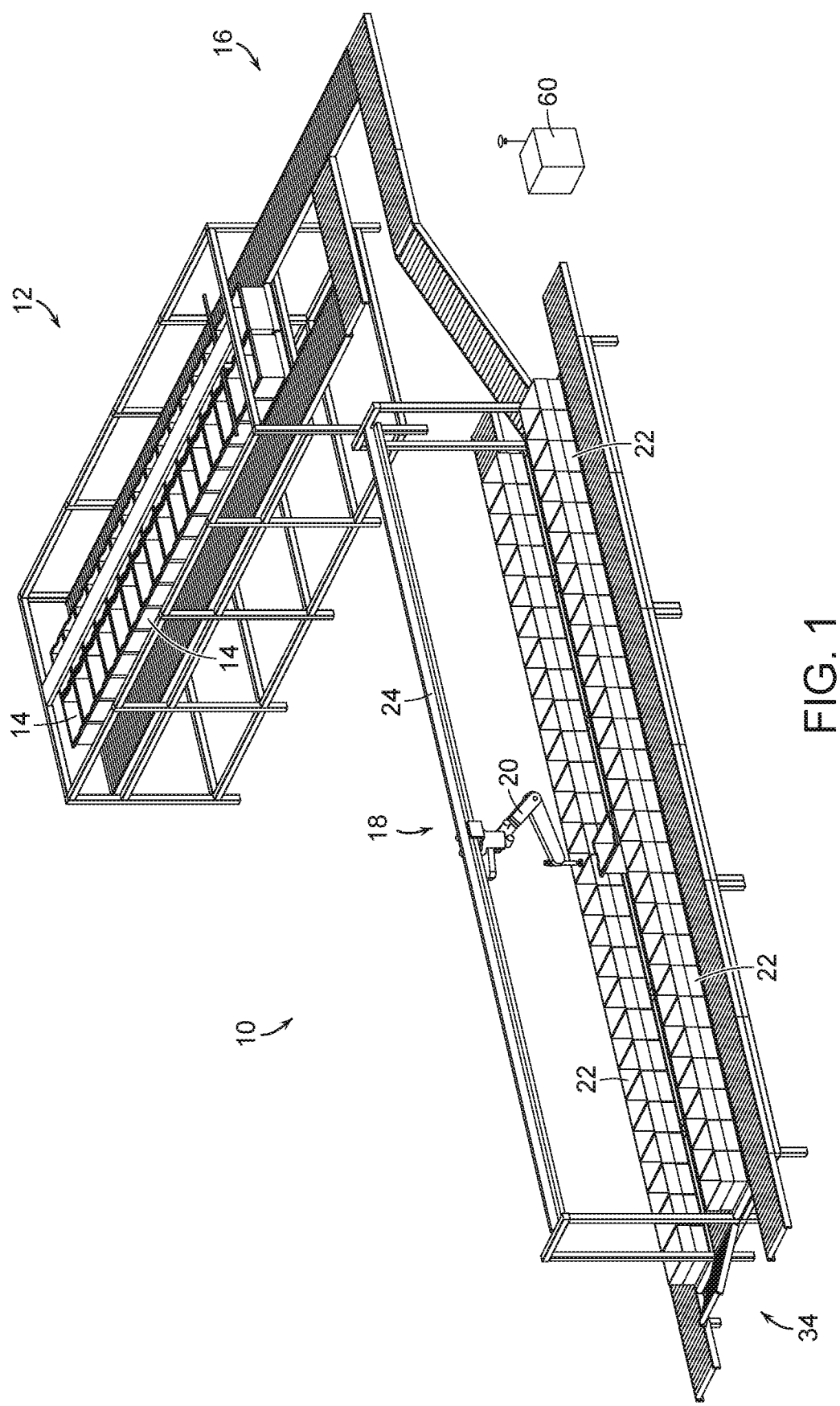
FIG. 1 shows an illustrative diagrammatic view of a storage, retrieval and processing system in accordance with an embodiment of the present invention.

With reference to FIG. 1, a system 10 of an embodiment of the present invention includes storage section 12 for storing a plurality of storage bins 14, a retrieval section 16, and a processing section 18 that includes a programmable motion device 20 and destination bins 22. Generally, storage bins 14 are provided to the processing section 18 by a bin displacement mechanism and the retrieval section 16. As further discussed below, the programmable motion device 20 (e.g., a robotic articulated arm) has a base that moves back and forth along a gantry 24 above the selected storage bin(s). The programmable motion device 20 is programmed to retrieve objects from the selected storage bin(s), and provide them to destination bins 22 in accordance with a manifest.

Figure 2:
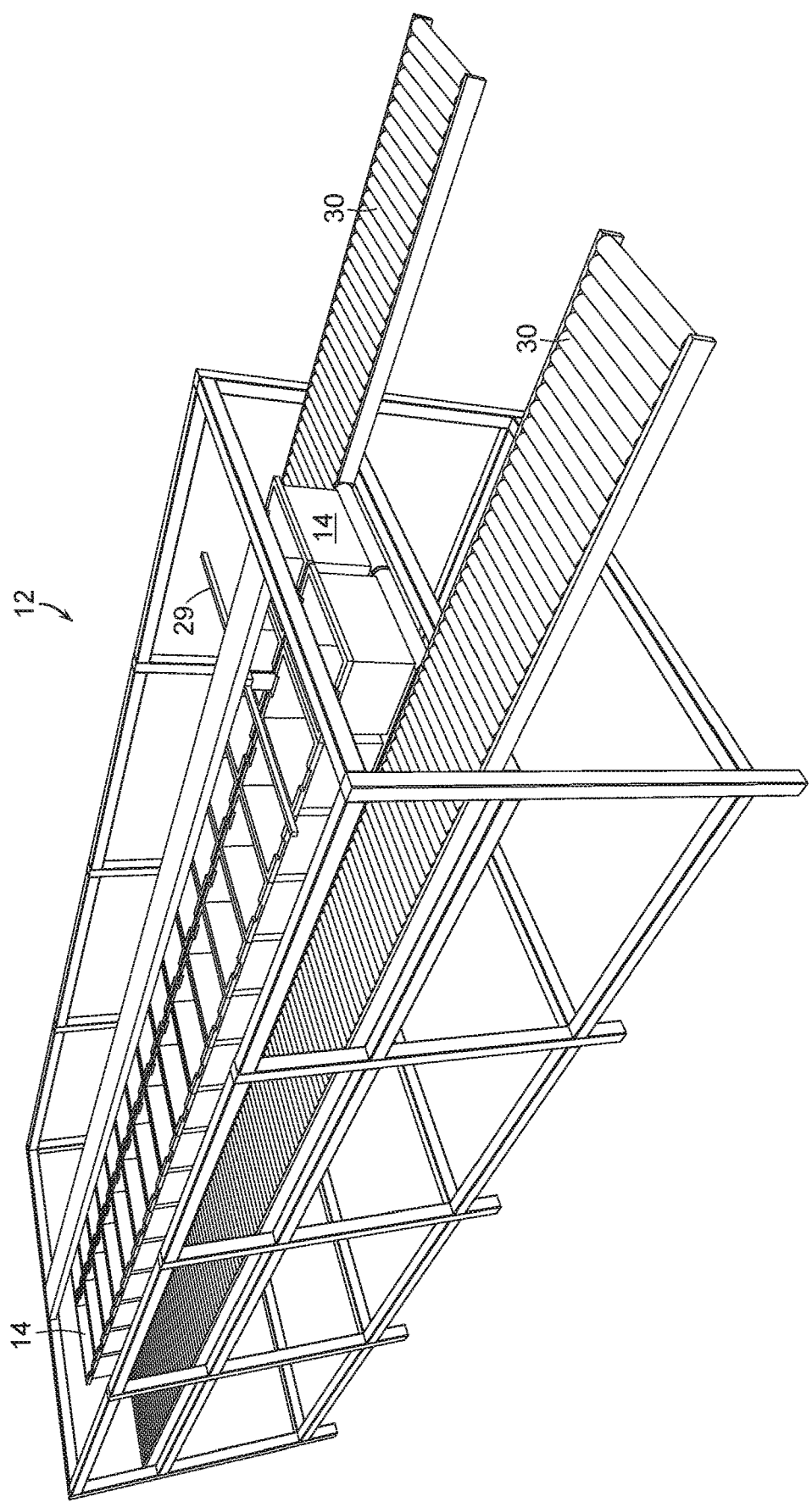
FIG. 2 shows an illustrative diagrammatic view of a portion of a retrieval conveyance system for use in the storage, retrieval and processing system of FIG. 1.
Figure 3A:
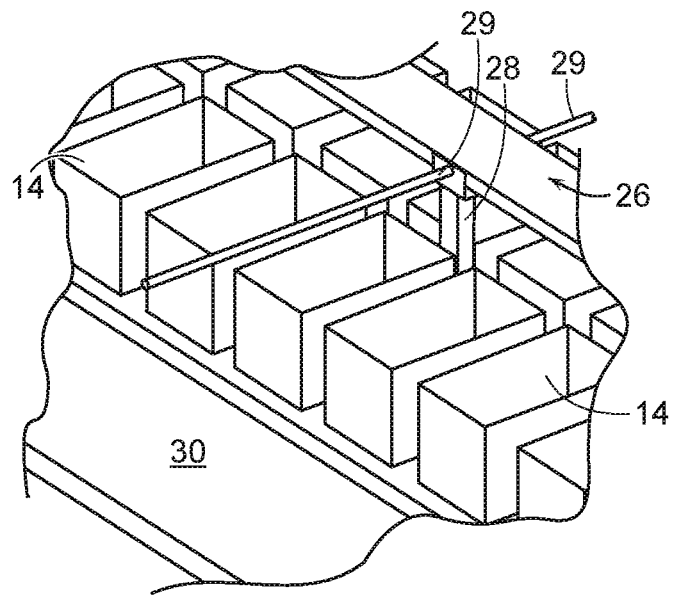
FIGS. 3A and 3B show illustrative diagrammatic views of an embodiment of a bin displacement system for use in a retrieval conveyance system of the invention.
Figure 3B:
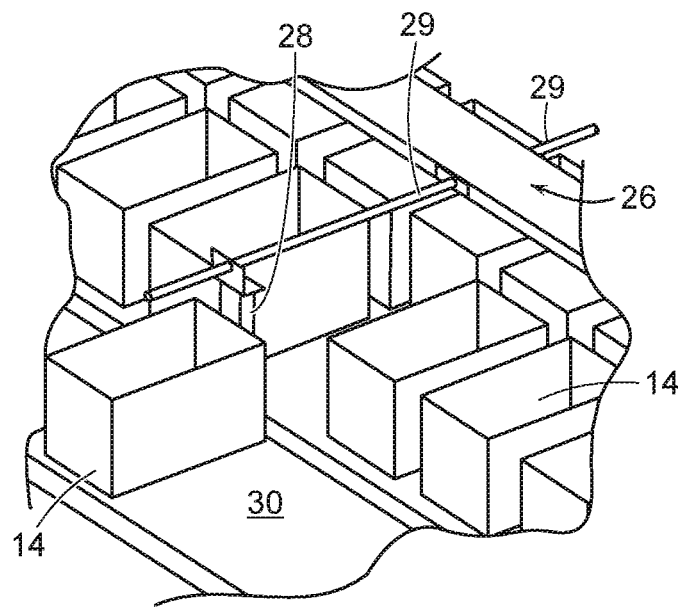

The storage section 12 includes two rows of storage bins 14, and the system knows what is in each bin, and where each bin is positioned along the two rows as further shown in FIG. 2. When a particular storage bin 15 is selected, the system will actuate a bin removal mechanism 26 that travels along between the bins, and stops adjacent the selected bin as shown in FIG. 3A. With reference to FIG. 3B, the system will then move an urging member 28 of the mechanism 26 to push the selected bin onto a conveyor 30 of the retrieval section 16, from which the selected storage bin will be directed to the processing section 18. The removal mechanism 26 may actuate the urging member 28 by any of a variety of processes, including having the support beam 29 be threaded with the urging member 28 being threaded onto the beam 29 such that it moves when the support beam is rotated, or by other mechanical, pneumatic or electronic actuation.

The conveyor 30 (as well as the other conveyors in the system) may be motion controlled so that both the speed and the direction of the conveyor (e.g., rollers or belt) may be controlled. In certain embodiments, the conveyors 30 and all of the conveyors of the retrieval section 16 may be gravity biased to cause any storage bin on any conveyor system to be delivered to the processing section 18. In such a gravity fed system, when a bin is removed, the system will know that all bins uphill of the removed bin will move (e.g., roll) one bin lower on the conveyor. Further new bins may be manually or automatically added to the uphill end of the storage conveyor.

The bins may be provided as boxes or containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 4:
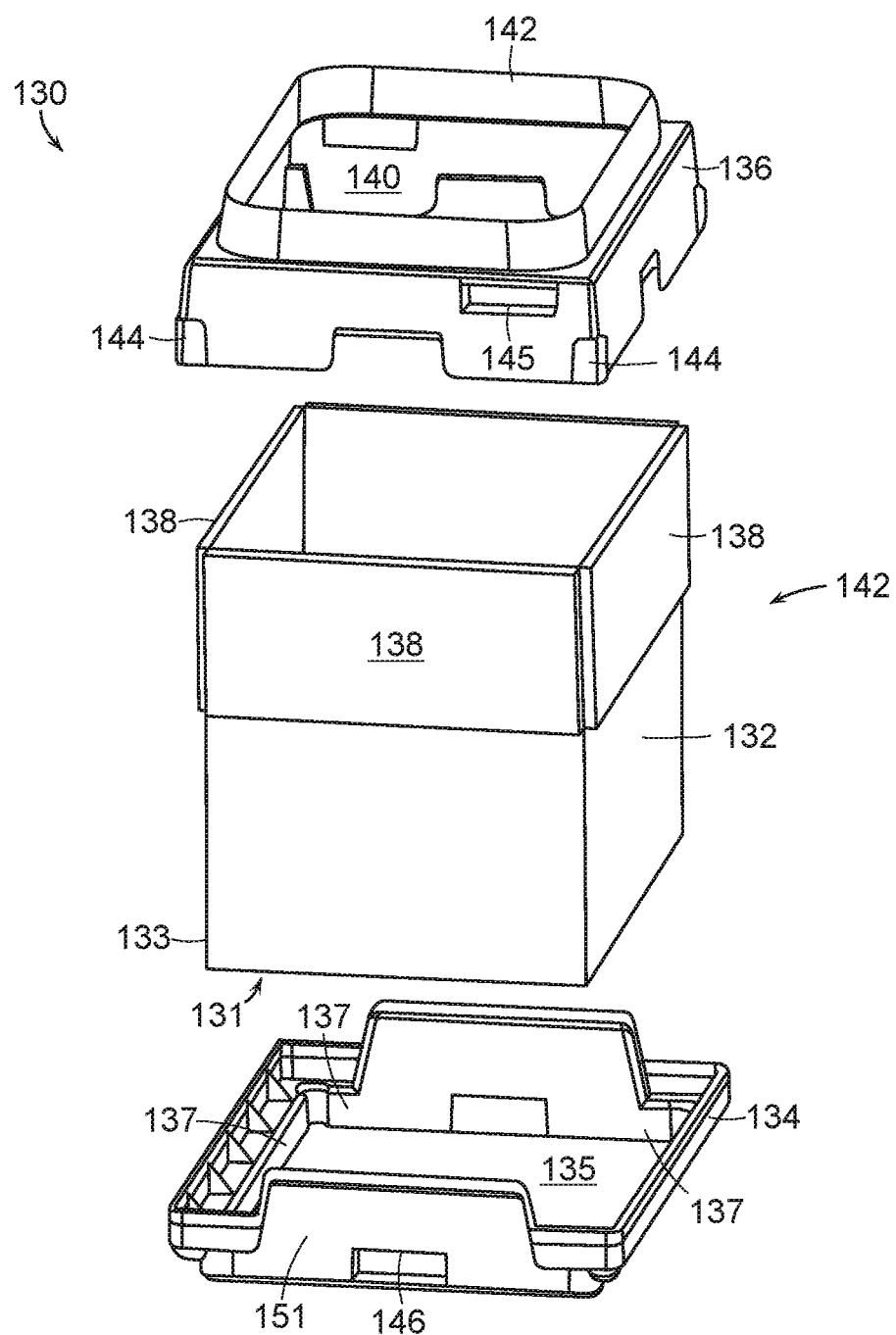
FIG. 4 shows an illustrative diagrammatic exploded view of a box assembly for use as a storage bin or destination bin in accordance with various embodiments of the present invention.

For example, FIG. 4 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 4, the box 132 may include top flaps 138 that, when opened as shown, are held open by inner surfaces 140 of the box cover 136. The box cover 136 may also include a recessed (protected) area in which a label or other identifying indicia 145 may be provided The box cover 136 also provides a defined rim opening 142, as well as corner elements 144 that may assist in providing structural integrity of the assembly, and may assist in stacking un-used covers on one another. Un-used box trays may also be stacked on each other.

Figure 5:
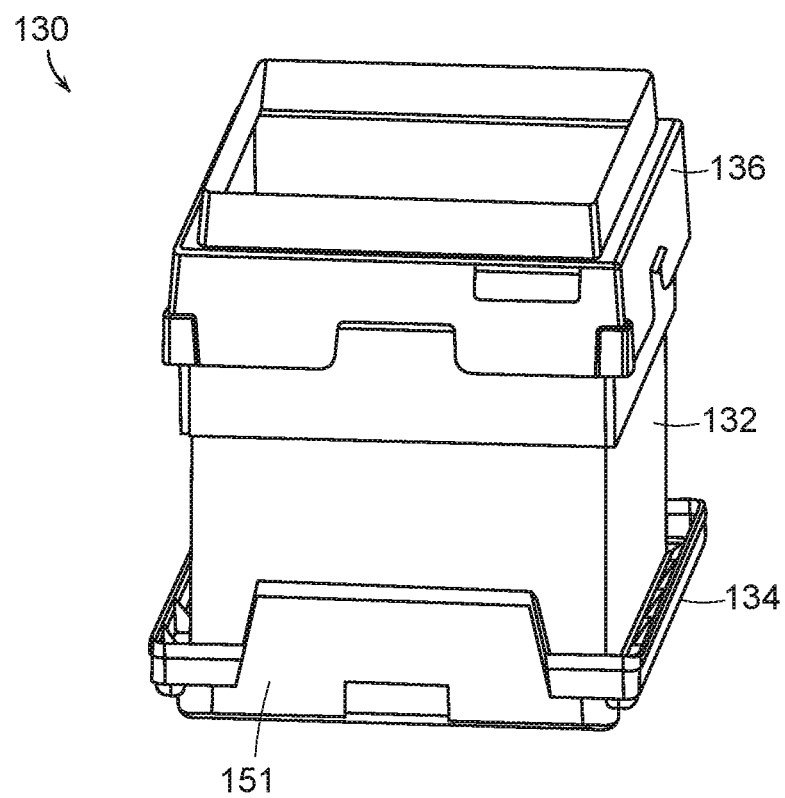
FIG. 5 shows the assembled box tray assembly of FIG. 4.

The box 132 is thus maintained securely within the box tray 134, and the box cover 136 provides that the flaps 138 remain down along the outside of the box permitting the interior of the box to be accessible through the opening 142 in the box cover 136. FIG. 5 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 6A:
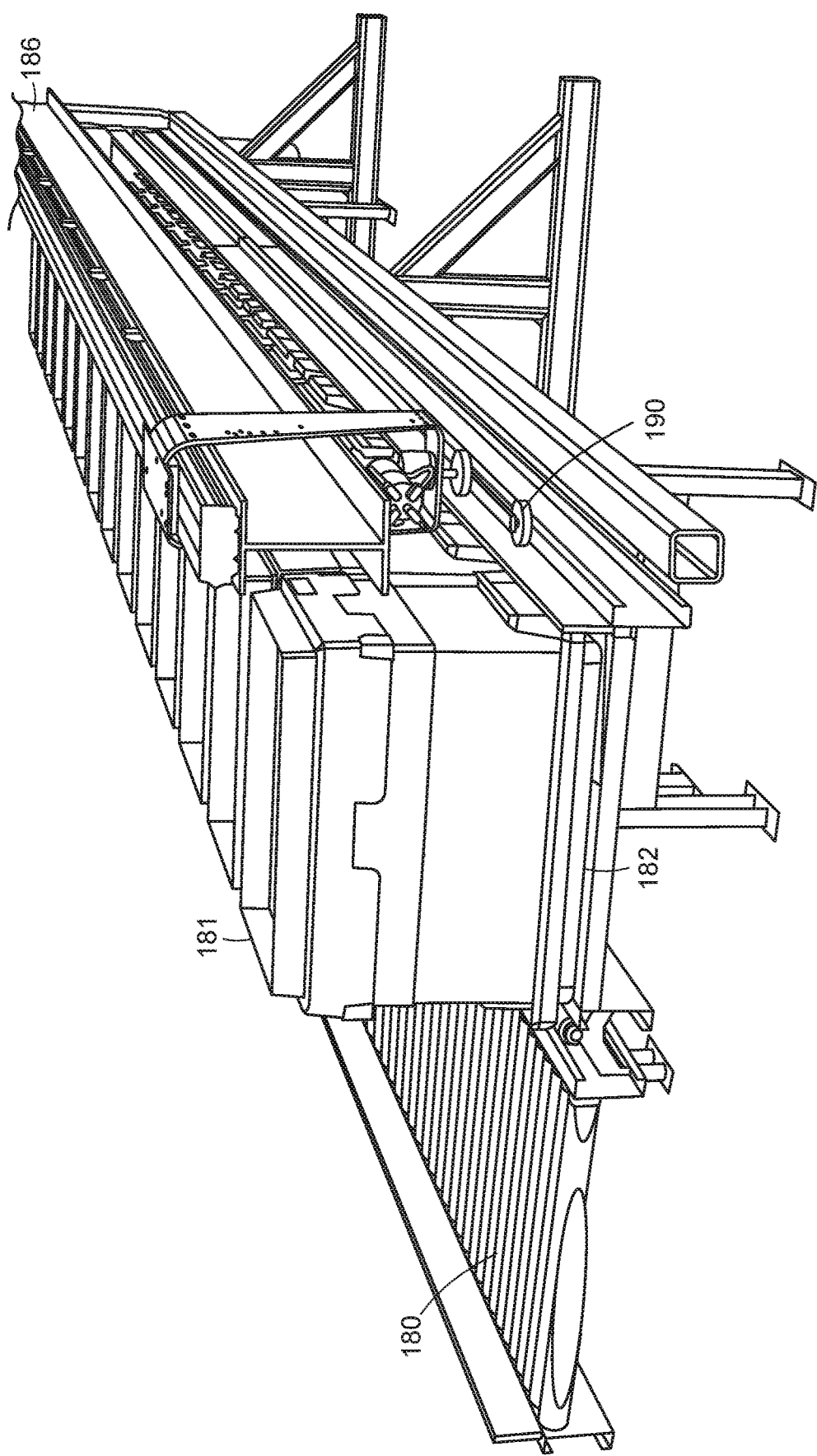
FIG. 6A-6D show illustrative diagrammatic views of a further embodiment of a bin displacement system for use in further embodiments of the invention.
Figure 6B:
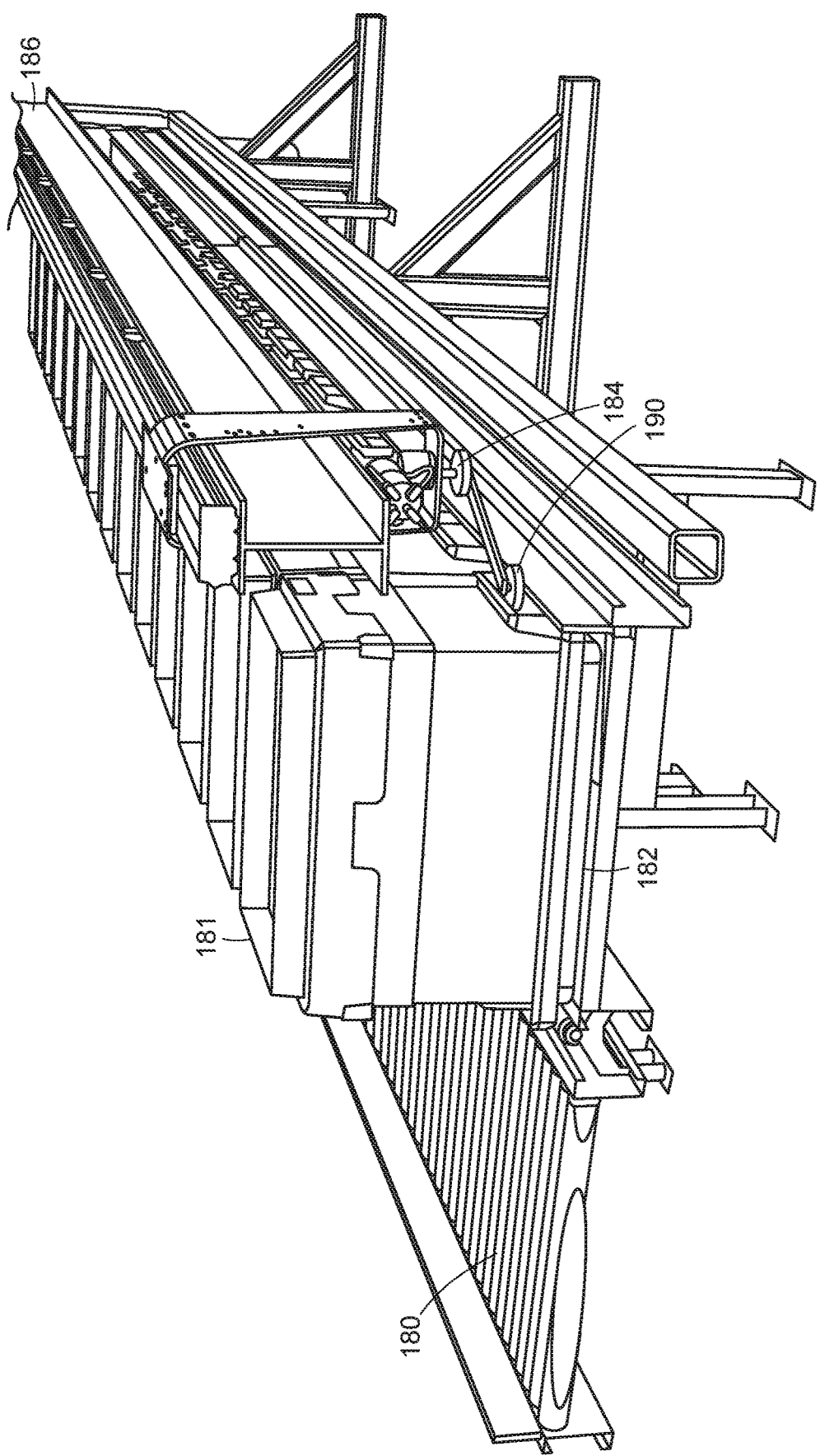
Figure 6C:
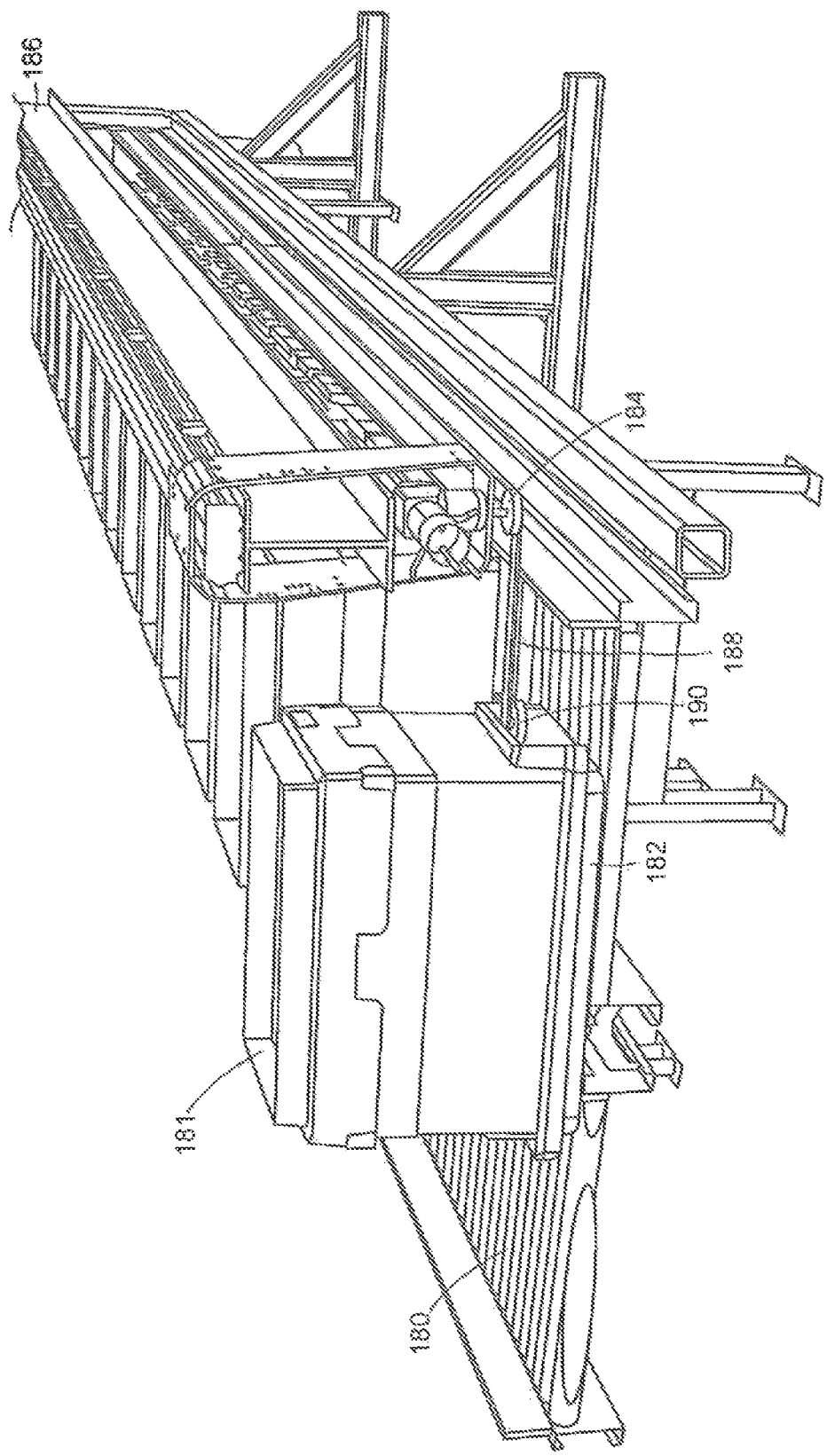
Figure 6D:
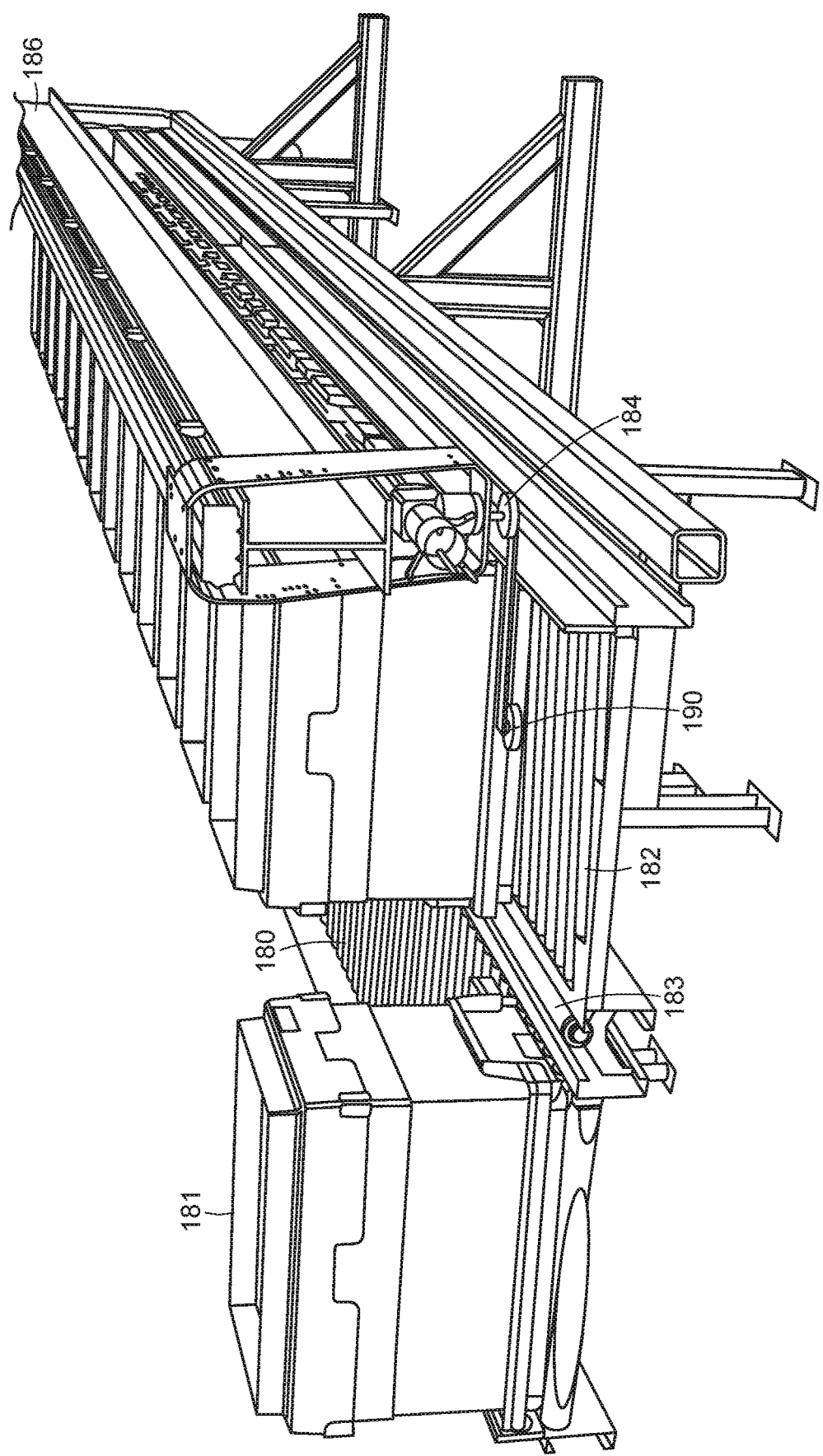

With reference to FIGS. 6A-6D, a box kicker 184 in accordance with an embodiment of the present invention may be suspended by and travel along a track 186, and may include a rotatable arm 188 and a roller wheel 190 at the end of the arm 188. With reference to FIGS. 6B-6D, when the roller wheel 190 contacts the kicker plate 151 (shown in FIG. 4) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181.

Figure 7:
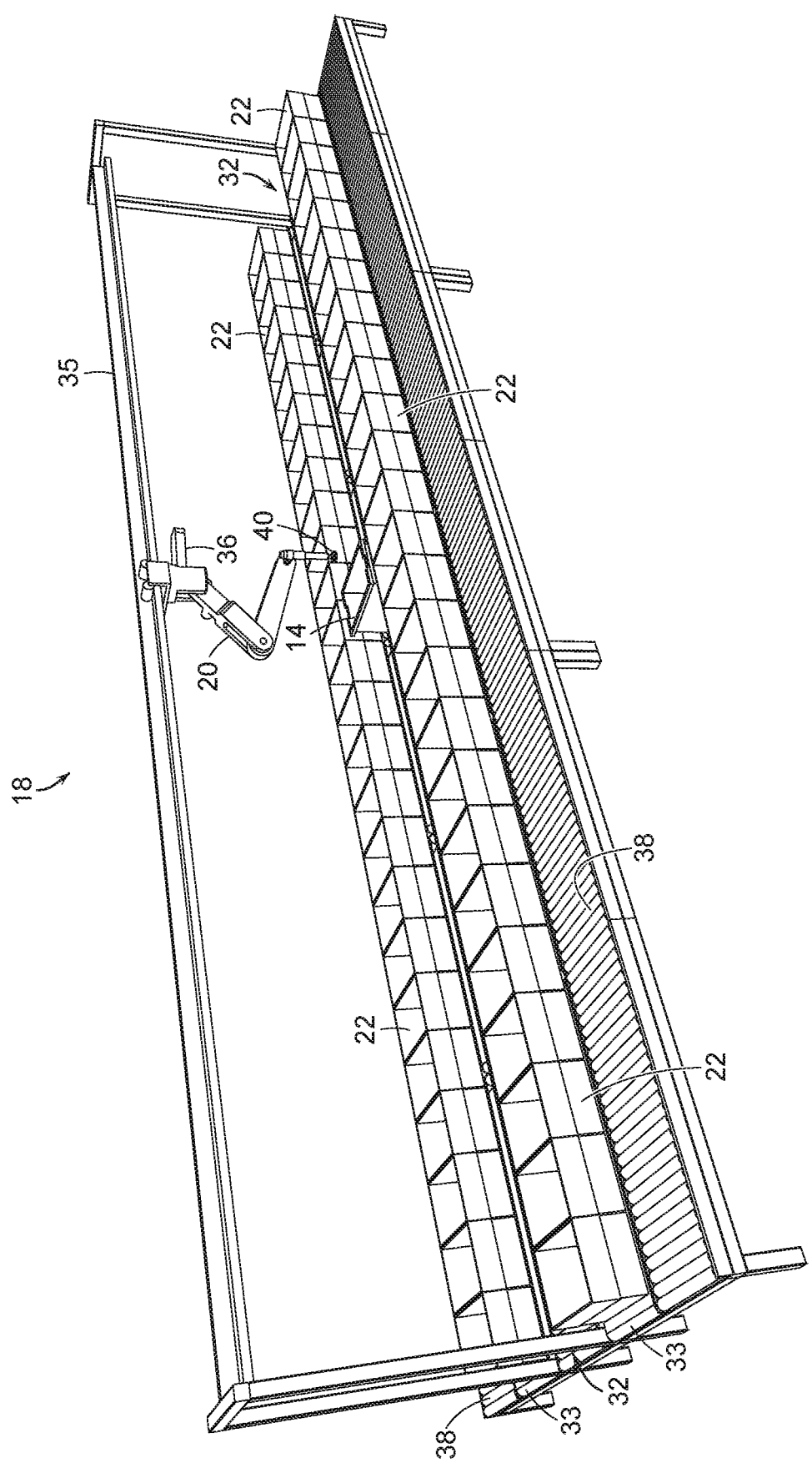
FIG. 7 shows an illustrative diagrammatic view of a processing station in a system of an embodiment of the present invention.

With reference to FIG. 7, the selected storage bin is received along a storage processing conveyor 32. In various embodiments, the selected storage bin 14 may be processed fully and then discarded at an exit end 34 (shown in FIG. 1)

of the conveyor 32, or in certain embodiments, multiple selected storage bins may be processed in batches, with the empty boxes being discarded together. During processing, a perception unit 36 is attached to the device base, and looks down into the selected storage bin 14. The end effector 40 of the programmable motion device 20 grasps an object in the bin 14, and moves to deliver the object to a desired destination bin 22. The programmable motion device 20 together with the grasped object may be moved along a gantry 35 to a desired destination bin 22. Each of the objects in the selected storage bin 14 is provided to a destination bin 22 as required, and the bin 14 is then moved away from the processing area.

In other embodiments, and in the event that the bin 14 is not emptied but processing of the bin is otherwise complete, the system may return the bin 14 to the storage section 12 along the retrieval section 16 in the reverse direction. In this case, the returned storage bin may be returned anywhere in a line of the bins (e.g., an end) as long as the system knows where the bin has been returned, and knows how each of the bins may have been moved when the selected storage bin was transferred to the conveyor 32. The storage bins, for example, may be biased (e.g., by gravity) to stack against one of the ends of each row of bins. Once a destination bin is completed, the system may employ the programmable motion device 20 to push the completed bin onto an output conveyor 38.

Figure 8:
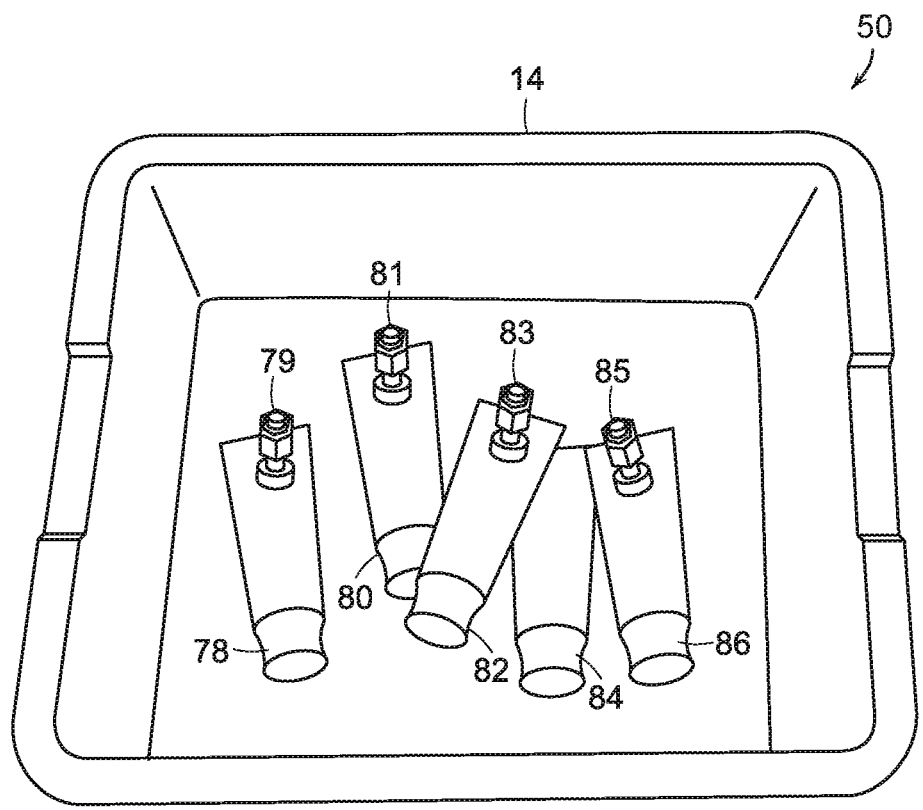
FIG. 8 shows an illustrative diagrammatic view from the perception system of FIG. 5, showing a view of objects within a bin of objects to be processed.

FIG. 8 shows an image view 50 of the bin 14 from the perception unit 36. The image view shows the bin 14 (e.g., on the conveyor), and the bin 14 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location as shown in FIG. 8. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 9A:
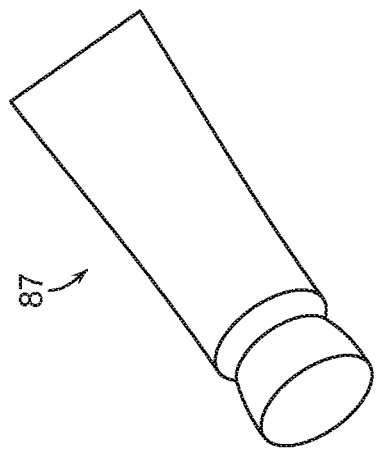
FIGS. 9A and 9B show an illustrative diagrammatic view of a grasp selection process in a storage, retrieval and processing system of the an embodiment of the present invention.
Figure 9B:
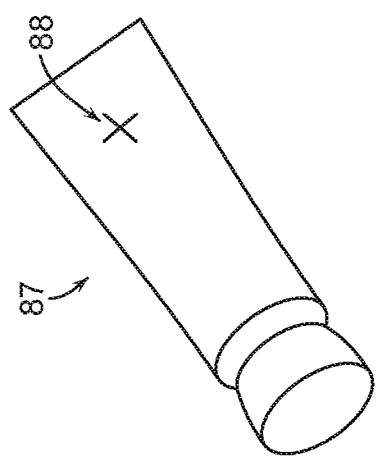

As shown in FIGS. 9A and 9B, the perception system may also identify portions of an object that are the most flat in the generation of good grasp location information. In particular, if an object includes a tubular end and a flat end such as object 87, the system would identify the more flat end as shown at 88 in FIG. 9B. Additionally, the system may select the area of an object where a UPC code appears, as such codes are often printed on a relatively flat portion of the object to facilitate scanning of the barcode.

Figure 11A:
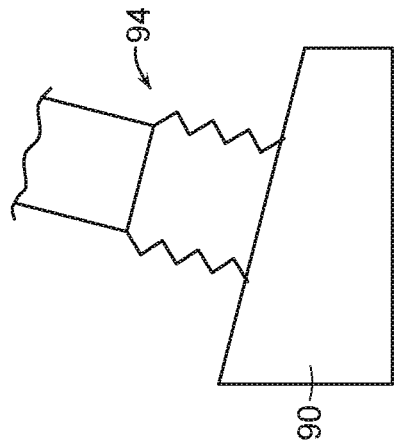
FIGS. 11A and 11B show an illustrative diagrammatic view of a grasp execution process in a storage, retrieval and processing system of the an embodiment of the present invention.
Figure 11B:
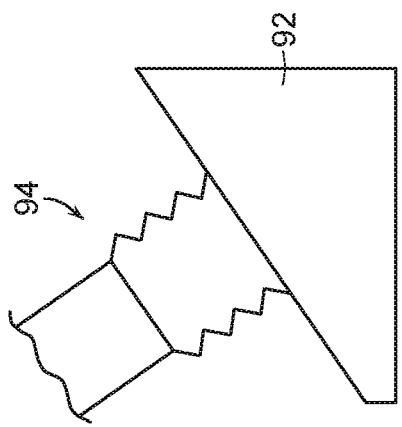
Figure 10A:
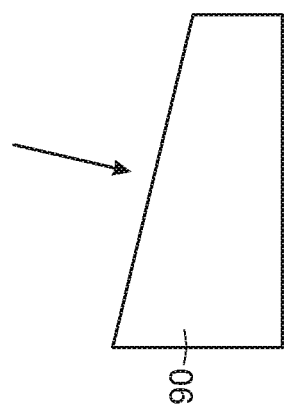
FIGS. 10A and 10B show an illustrative diagrammatic view of a grasp planning process in a storage, retrieval and processing system of the an embodiment of the present invention.
Figure 10B:
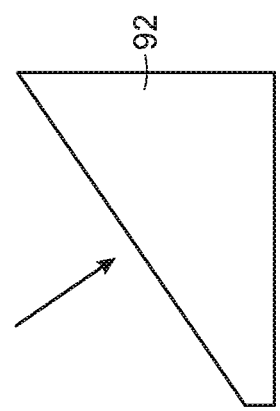

FIGS. 10A and 10B show that for each object 90, 92, the grasp selection system may determine a direction that is normal to the selected flat portion of the object 90, 92. As shown in FIGS. 11A and 11B, the robotic system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

With reference again to FIG. 7, destination bins 22 that are full or are otherwise finished being processed, may be moved to a respective output conveyor 38 for further processing, e.g., further packaging labeling or shipment. Such bins (e.g., box assemblies as discussed above), may be moved from a respective destination bin processing conveyor 33 to an output conveyor 38 by any of a variety of means, including having either human personnel move the bin, having the robot move the bin, or employing a box kicker 184 as discussed above with reference to FIGS. 6A-6D. Such a box kicker 184 may, for example, be employed along each long side of the storage processing conveyor 32, and be used to urge completed boxes from a conveyor 33 to an adjacent conveyor 33.

With reference to FIG. 12, in accordance with a further embodiment, the system 100 may include multiple sets (e.g., 2) of storage bins in rows with bin removal mechanisms at a storage section 102, each of which is in communication with a retrieval section 104, which in turn, is in communication with multiple (e.g., two) parallel processing sections 106, each of which includes a programmable motion device 108 that runs along a gantry 110.

Figure 13:
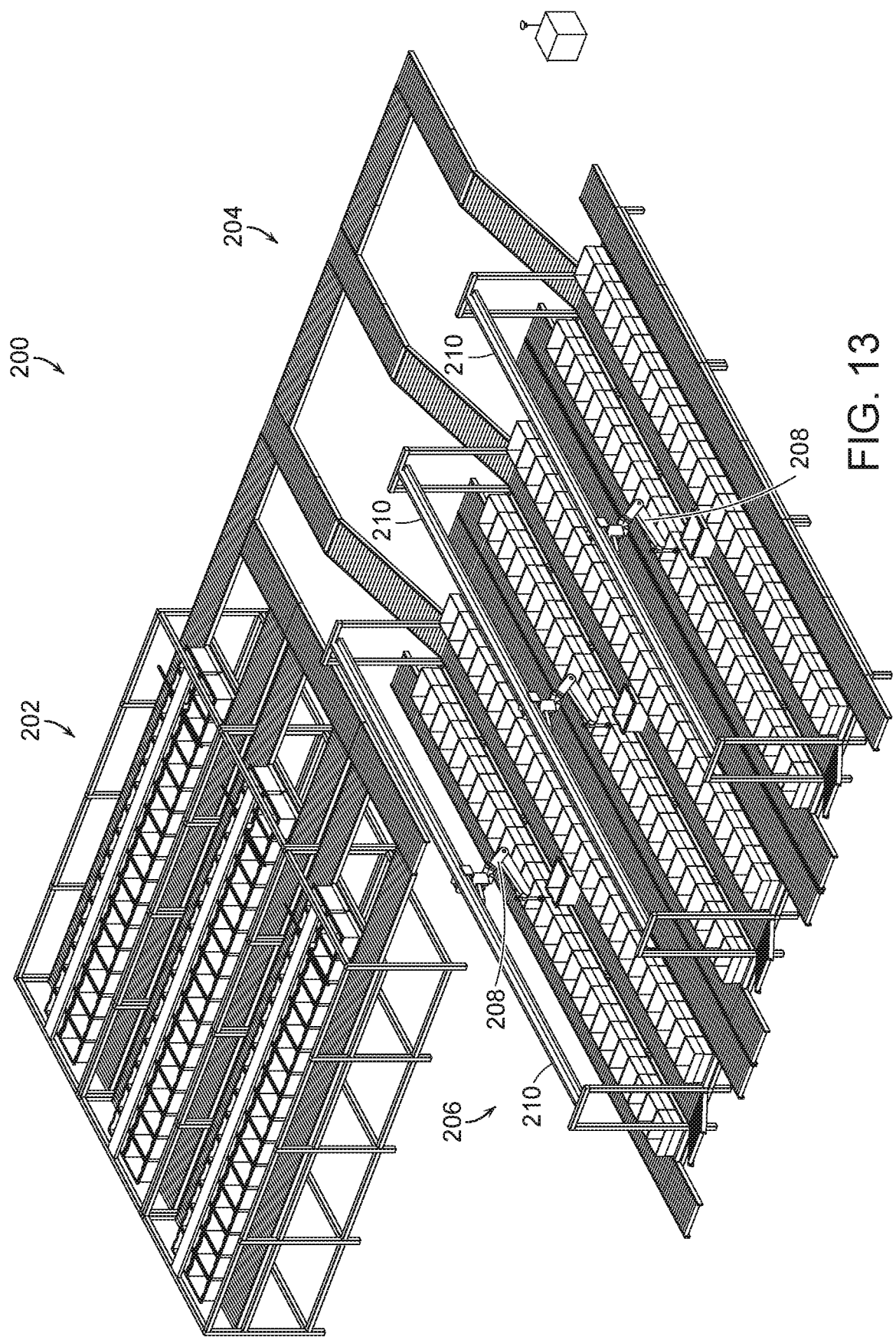
FIG. 13 shows an illustrative diagrammatic view of a storage, retrieval and processing system in accordance with a further embodiment of the present invention involving further retrieval conveyance systems and further processing stations.

In accordance with a further embodiment and with reference to FIG. 13, the system 200 may multiple sets (e.g., three) of storage bins in rows with bin removal mechanisms at a storage section 202, each of which is in communication with a retrieval section 204, which in turn, is in communication with multiple (e.g., three) parallel processing sections 206, each of which includes a programmable motion device 208 that runs along a gantry 210.

Control of the overall system 10, 100 and 200 may be provided by a computer system 60 that is in communication with the bin removal mechanism, the conveyors, as well the programmable motion device 20. The computer system 60 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modification and variations may be made to the above disclosed embodiments without departing from the spirit and scope of the present invention.

What is claimed is:

1. A storage, retrieval and processing system for processing objects, said storage, retrieval and processing system comprising:
   a retrieval conveyance system that includes an input conveyance system and an output conveyance system;
   a plurality of storage bins providing storage of a plurality of objects, said plurality of storage bins being in communication with the input conveyance system;
   a programmable motion device in communication with the input conveyance system for receiving one or more selected storage bins from the plurality of storage bins, said programmable motion device including an end effector for grasping and moving a selected object out of each selected storage bin, and being adapted for movement of the programmable motion device along a first direction;
   a plurality of destination bins being provided in at least one linear arrangement along the first direction of movement of the programmable motion device, wherein each destination bin is adjacent to the output conveyance system and wherein the programmable motion device is adapted to place the selected object from the selected storage bin into a selected destination bin among the plurality of destination bins; and
   a destination bin removal system that travels along the at least one linear arrangement of destination bins to a completed destination bin and urges the completed destination bin onto the output conveyance system for conveying the completed destination bin to a further processing location.

2. The storage, retrieval and processing system as claimed in claim 1, wherein the plurality of storage bins is provided in at least one linear arrangement adjacent the input conveyance system, and wherein the storage, retrieval and processing system further includes a storage bin displacement system that travels along the linear arrangement of the plurality of storage bins to a selected storage bin and urges the selected storage bin onto the input conveyance system.

3. The storage, retrieval and processing system as claimed in claim 1, wherein the programmable motion device is suspended from a gantry, and is movable along the first direction while suspended from the gantry.

4. The storage, retrieval and processing system as claimed in claim 1, wherein the programmable motion device includes an articulated arm.

5. The storage, retrieval and processing system as claimed in claim 1, wherein the further processing location is a shipment transport location.

6. The storage, retrieval and processing system as claimed in claim 1, wherein the destination bins are provided in at least two linear arrangements on either side of the direction of movement of the programmable motion device.

7. The storage, retrieval and processing system of claim 1, wherein the destination bin removal system comprises a rotatable arm configured to travel along a track adjacent to the at least one linear arrangement of destination bins to the completed destination bin and rotate into contact with the completed destination bin to push the completed destination bin onto the output conveyance system.

8. The storage, retrieval and processing system of claim 1, wherein the destination bin removal system comprises a urging member threadably coupled a support beam, the support beam being configured to travel along a path adjacent to the at least one linear arrangement of destination bins to the completed destination bin, the urging member being configured to move along the support beam to push the completed destination bin onto the output conveyance system in response to a rotation of the support beam.

9. The storage, retrieval and processing system as claimed in claim 1, wherein the articulated arm is positioned above a portion of the retrieval conveyance system.

10. The storage, retrieval and processing system as claimed in claim 9, wherein the programmable motion device reciprocally moves between two rows of the plurality of destination bins.

11. A storage, retrieval and processing system for processing objects, said storage, retrieval and processing system comprising:
   a plurality of storage bins providing storage of a plurality of objects, said plurality of storage bins provided in at least one linear arrangement adjacent to an input conveyance system;
   a storage bin removal system that travels along the at least one linear arrangement of storage bins to a selected storage bin and urges the selected storage bin onto the input conveyance system;
   a programmable motion device in communication with the input conveyance system for receiving one or more selected storage bins from the plurality of storage bins, said programmable motion device including an end effector for grasping and moving a selected object out of each selected storage bin, and being adapted for movement of the programmable motion device along a first direction; and
   a plurality of destination bins being provided in at least one linear arrangement along the first direction of movement of the programmable motion device, wherein the programmable motion device is adapted to place the selected object from the selected storage bin into a selected destination bin among the plurality of destination bins.

12. The storage, retrieval and processing system as claimed in claim 11, wherein the programmable motion device is suspended from a gantry, and is movable along the first direction while suspended from the gantry.

13. The storage, retrieval and processing system as claimed in claim 11, wherein the programmable motion device includes an articulated arm.

14. The storage, retrieval and processing system as claimed in claim 11, wherein the destination bins are provided in at least two linear arrangements on either side of the direction of movement of the programmable motion device.

15. The storage, retrieval and processing system of claim 11, wherein the storage bin removal system comprises a rotatable arm configured to travel along a track adjacent to the at least one linear arrangement of storage bins to the selected storage bin and rotate into contact with the selected storage bin to push the completed destination bin onto the input conveyance system.

16. The storage, retrieval and processing system of claim 11, wherein the storage bin removal system comprises a urging member threadably coupled a support beam, the support beam being configured to travel along a path adjacent to the at least one linear arrangement of storage bins to the selected storage bin, the urging member being configured to move along the support beam to push the selected storage bin onto the input conveyance system in response to a rotation of the support beam.

17. The storage, retrieval and processing system as claimed in claim 11, wherein the articulated arm is positioned above a portion of the input conveyance system.

18. The storage, retrieval and processing system as claimed in claim 17, wherein the programmable motion device reciprocally moves between two rows of the destination bins.

19. The storage, retrieval and processing system as claimed in claim 18, wherein the storage, retrieval and processing system further includes a destination bin removal system for urging a completed destination bin onto an output conveyance system.

20. The storage, retrieval and processing system as claimed in claim 18, wherein each destination bin is provided adjacent to an output conveyance system for receiving completed destination containers and for providing the completed destination containers to a further processing location.

21. The storage, retrieval and processing system as claimed in claim 20, wherein the further processing location is a shipment transport location.

22. A method of providing storage, retrieval and processing of objects, comprising:
    providing a plurality of storage bins for storing a plurality of objects, said plurality of storage bins provided in at least one linear arrangement adjacent to an input conveyance system;
    directing a storage bin removal system to travel along the linear arrangement of storage bins to a selected storage bin and urge the selected storage bin onto the input conveyance system;
    moving the selected storage bin on the input conveyance system from the plurality of storage bins to a processing area in communication with a programmable motion device;
    grasping and moving one or more selected objects out of the selected storage bin;
    providing the selected objects to one or more destination bins among a plurality of destination bins that are provided in at least one linear arrangement adjacent to an output conveyance system; and
    directing a destination bin removal system to travel along the linear arrangement of destination bins to a completed destination bin and urge the completed destination bin onto the output conveyance system.

23. The method as claimed in claim 22, wherein the destination bins are provided in at least two linear arrangements on either side of a direction of movement of the programmable motion device.

* * * * *